(12) United States Patent
Calvet Puig

(10) Patent No.: US 9,295,221 B2
(45) Date of Patent: Mar. 29, 2016

(54) METHOD FOR PRESSING CHEESE MOLDS AND CHEESE MOLD PRESSING MACHINE

(75) Inventor: Joan Calvet Puig, Campllong (ES)

(73) Assignee: TECNICAL TECNOLOGIA APLICADA, S.L.L., Campllong (ES)

( * ) Notice: Subject to any disclaimer, the term of this patent is extended or adjusted under 35 U.S.C. 154(b) by 46 days.

(21) Appl. No.: 13/805,484

(22) PCT Filed: Nov. 22, 2010

(86) PCT No.: PCT/ES2010/070762
§ 371 (c)(1),
(2), (4) Date: Jul. 26, 2013

(87) PCT Pub. No.: WO2012/069669
PCT Pub. Date: May 31, 2012

(65) Prior Publication Data
US 2013/0323385 A1 Dec. 5, 2013

(51) Int. Cl.
*A01J 25/15* (2006.01)
*A01J 25/13* (2006.01)
*A01J 25/12* (2006.01)
*A01J 25/00* (2006.01)

(52) U.S. Cl.
CPC ............... *A01J 25/15* (2013.01); *A01J 25/007* (2013.01); *A01J 25/008* (2013.01); *A01J 25/12* (2013.01); *A01J 25/123* (2013.01); *A01J 25/13* (2013.01)

(58) Field of Classification Search
CPC ............ A01J 25/12; A01J 25/15; A01J 25/13
USPC ............ 425/357, 233, 234, 358, 363, 364 R, 425/347, 425, 415, 439
See application file for complete search history.

(56) References Cited

U.S. PATENT DOCUMENTS

| | | | | |
|---|---|---|---|---|
| 2,347,793 A | * | 5/1944 | Petersen | 100/195 |
| 2,362,089 A | | 11/1944 | Peters | |
| 2,514,007 A | * | 7/1950 | Peters | 100/199 |
| 2,604,036 A | * | 7/1952 | Miollis | 100/195 |
| 3,008,235 A | * | 11/1961 | Royer et al. | 426/478 |

FOREIGN PATENT DOCUMENTS

| | | | | |
|---|---|---|---|---|
| AU | 1598270 | 12/1971 | | |
| DE | 102006034548 | 12/2009 | | |
| EP | 0 350 777 | * | 7/1989 | ............ A01J 25/12 |
| EP | 0566520 | 7/1997 | | |
| EP | 2132981 | 12/2009 | | |
| ES | 167451 | 1/1972 | | |
| ES | 233847 | 4/1978 | | |

* cited by examiner

*Primary Examiner* — Seyed Masoud Malekzadeh
(74) *Attorney, Agent, or Firm* — JMB Davis Ben-David

(57) ABSTRACT

The present disclosure relates to a method and machine for pressing molds in a horizontal manner. More particularly, the disclosure relates to a machine and method for turning molds over from a vertical to a horizontal position before placing in the press device, such that the molds may be pressed while in a horizontal position, even if the molds were previously filled in a vertical position.

11 Claims, 8 Drawing Sheets

METHOD FOR PRESSING CHEESE MOLDS AND CHEESE MOLD PRESSING MACHINE

FIELD OF THE INVENTION

The present invention relates to a method and machine for pressing molds. More particularly, the invention comprises a means for turning over the molds, such that the molds may be pressed while in a horizontal position, even if the molds were previously filled in a vertical position.

BACKGROUND OF THE INVENTION

Various presses are known in the state of the art for molds, particularly ones with cheese inside.

European Patent No. 0566520 "PRESS FOR CHEESES AND MOLD BATTERY FOR CHEESES FOR USE THEREIN" from 1993, in the name of APV CHEESE AS, which relates to a cheese press of the type having a tubular, pressed surrounding body that can be activated to receive just one or several alignments of cheese molds or batteries of molds and which has at the top thereof a pressing body that extends longitudinally, of the elastic type, which can receive a pumping or inflating action in order to exert a downwards pressure force, characterized in that the presser body is made up of an elastic diaphragm made of rubber which, along the side edges thereof, is fixed in an airtight manner between respective edges of the lower part, which receives the mold, of the presser tube and a top part thereof, which is arranged vertically or which in a transverse section shows an upwardly arched structure from the bottom, thereby forming a top chamber of the tube above the diaphragm, with said chamber being connectable to a source of pressurized fluid or vacuum respectively, whereas the bottom chamber of the tube under the diaphragm can be connected to a CIP cleaning system.

Spanish Utility Model No. 0167451 "PRESS FOR MANUFACTURING CHEESE", in the name of Mr. Emilio CAMESELLE LAGO, relates to presses for manufacturing cheese, of the type wherein the columns of stacked molds are pressed by an endless screw and pushing plate thanks to levers hinged at an end of the framework, and which at the other end have weights mounted in slider fashion, characterized in that between the horizontal base platform and the top framework, are arranged series of bars in parallel vertical planes, provided in its turn with diametrically opposite side grooves, which are intended to act as guides for the supporting mold plates, which plate have, on one and the other side, straight and perpendicular parts that slide in said guides; each straight part being provided in the bottom part with a pawl, and in the top part with a hook, so that each support plate with its pawl maintains in suspension the hook of the supporting plate immediately below.

Spanish Utility Model No. 0233847, "PRESS FOR CHEESES", in the name of HEXA-MANUTENCION, S. A., relates to a press for cheeses, characterized in that it consists of a container or mold preferably of cylindrical shape, on the top edges and outside of which there are projections for attaching the lid and providing this part with drainage means, to allow liquids to drain out by pressing the raw material deposited inside.

Finally, there is German Patent No. 102006034548, "Vottichtung and Verfahren zum Pressen von Käse", in the name of ALPMA Alpenland Maschinenbau GmbH, discloses a cheese press with pressing instruments arranged on a stand for the pressing of press moulds that are filled with curd, with the pressing instruments designed to exert a horizontally directed pressing force to a horizontal pressing stack that is formed from multiple pressing moulds that are arranged next to each other in the direction of pressing.

SUMMARY OF THE INVENTION

This application relates to the sector of pressing foodstuffs arranged inside molds that give their final shape and arrangement to the foodstuff.

The closest document is Utility Model No. 0167451. This document describes a vertical stacking and pressing system. Contrary to the other documents in this one all the stacked molds are placed in order in vertical rows, by guides, so that the molds in one of the rows are separate from the molds in adjacent rows.

One of the reasons for doing it this way is to try and make all the cheeses come out the same size. Another reason is to achieve constant pressure on each and every one of the molds and therefore on the cheeses.

The problem that arises in this patent is mainly the loading system, which is vertical, and therefore it is not accessible, and the operator has to go up stairs and drop them down one after the other. Furthermore, it does not disclose how to dampen the fall of the mold containing the cheese from the height where it is loaded, and which can end up damaging the structure of the mold.

Also, it does not consider gravity. The mold arranged in the lowest place, receives the weight of each and every one of the molds it supports.

Therefore, the inventor designed a new method and machine for automatic horizontal stacking, on various levels (improving upon European Patent No. 0566520), so that loading is not a problem, because it is done horizontally and for each different level. Also disclosed is an automatic, novel unloading system that does not need human intervention. It also solves problems in the conventional art because both the first and last mold in one and the same row, receive the same pressure, because the last one does not receive the weight of the previous molds.

In addition, this special horizontal configuration makes it possible to quickly unload sideways all the lines on one level, successively.

It also comprises an initial mold turning over stage. When the food is inside the mold, the mold may be covered, and then placed on a vertical conveyor belt. The initial stage of the turning over does not require human intervention, because in a previous stage, before placing the mold in the horizontal rows, said mold is turned, so that it can enter the machine in a horizontal position.

Finally, when the molds are turned, in a horizontal position they are transported to a transfer structure where they are loaded. The transfer structure has means that enable it to ascend and descend, so that they can align themselves with the desired level where they want to load the molds.

Subsequently, said molds are passed to the first horizontal structure corresponding to the selected level.

An objective of this invention is a method for pressing cheese molds, of the type comprising: a first stage wherein molds with cheese inside them and a lid are transported to a means for turning over, a second stage wherein said molds are knocked down horizontally and this way they are transported and loaded onto a first transfer structure with lifting and descending movement to a suitable loading level, a third stage wherein said molds are transported from the transfer structure to a first horizontal structure, arranged on a first level, which lies in an initial position, until the first horizontal structure is full, a fourth stage wherein driving means move said first horizontal structure into an adjacent, second position, and place in the initial position a second horizontal structure, empty of molds to be loaded, and a fifth stage wherein once all the available structures have been loaded with molds, the molds are pressed, at both ends of structures, with a pressure means.

An additional objective of this invention is a mold pressing machine, of the type comprising a frame, machine supply means, comprising: turning over means that turn molds from a vertical position to a horizontal position, a first conveyor belt that transports the molds to a first transfer structure, with lifting and descending movement, to an appropriate loading level, a first horizontal structure, arranged on a first level, on which said molds are loaded horizontally, a second horizontal structure, empty, contiguous to the first structure, means for transferring said molds from the first transfer structure to the first horizontal structure, driving means that move said first structure to an adjacent, second position, and place in the initial position a second horizontal structure, free of molds for loading, and pressing means that press the molds at both ends of the structures.

BRIEF DESCRIPTION OF THE DRAWINGS

To facilitate the explanation, seven sheets of drawings are attached to this specification, which illustrate a practical embodiment, which is provided as a non-limiting example of the scope of this invention.

DETAILED DESCRIPTION OF THE INVENTION

Figure 1:
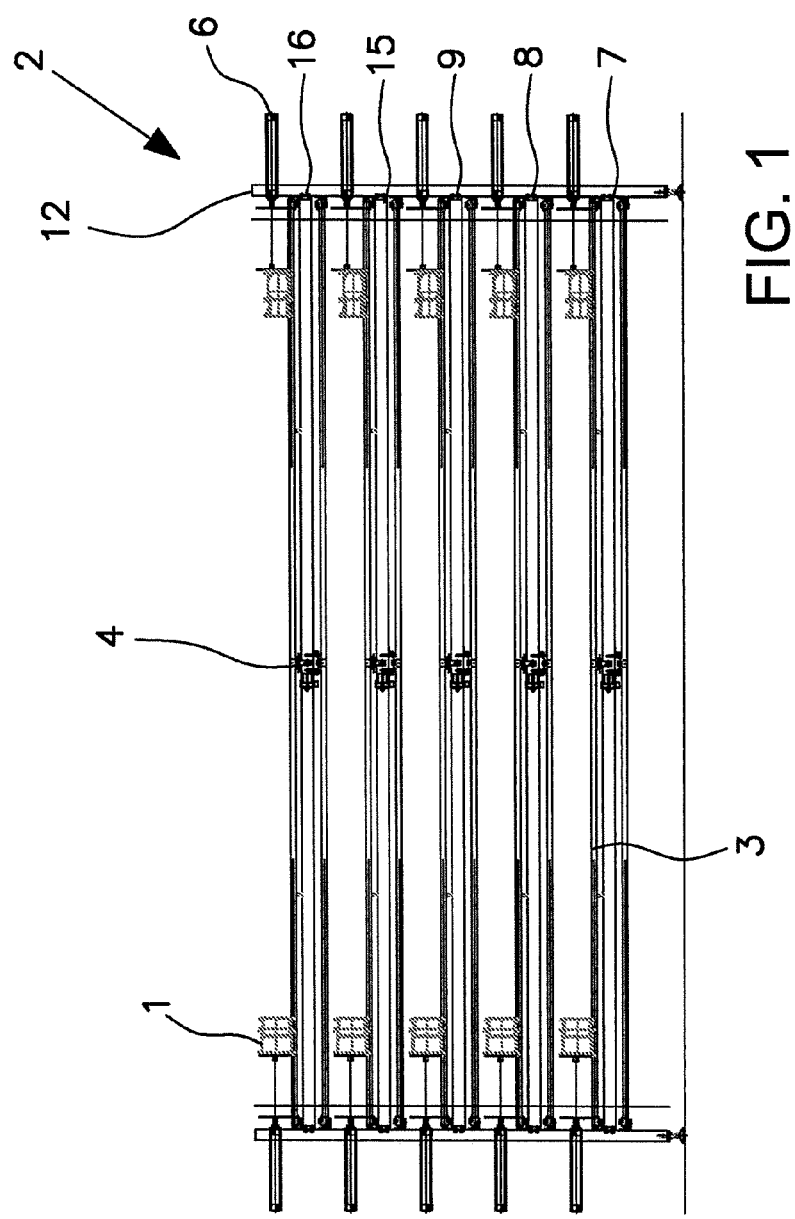
FIG. 1 is a side view of the press with different levels without the mold loader.

FIG. 1 illustrates an exemplary machine 2, with molds 1, a frame 12, driving means 4, pressure means or press 6, a first horizontal structure 3, a first level 7, a second level 8, a third level 9, a fourth level 15 and a fifth level 16.

Figure 2:
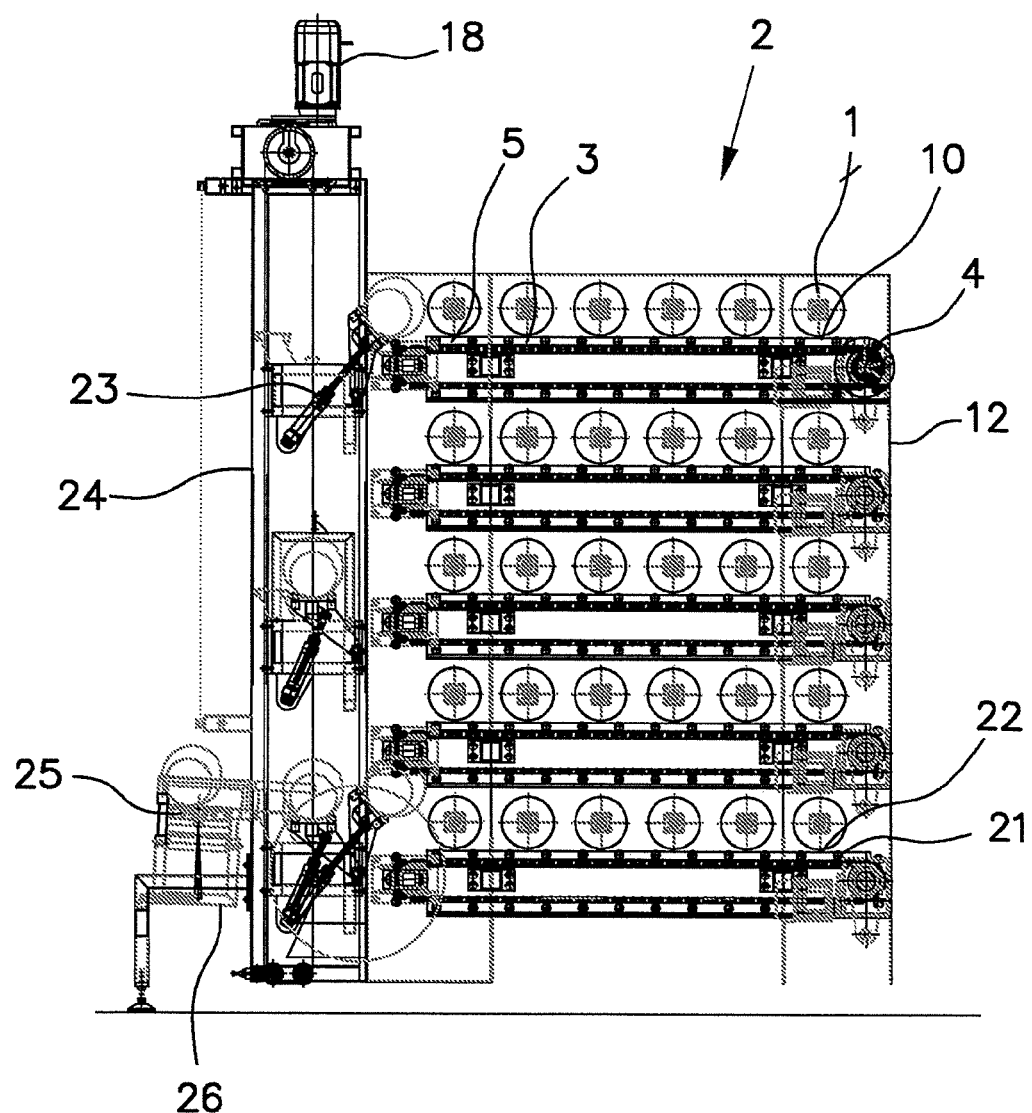
FIG. 2 is a front view of FIG. 1 with the first transfer structure and the swinging mechanism.

FIG. 2 shows exemplary machine 2, molds 1, frame 12, first structure 3, second structure 5, a third structure 10, driving means 4, a first transfer structure 24 with its swinging mechanism 23 and its lifting means 18, a first conveyor belt 25 with its turning over means 26, tubular elements 21 and a base 22.

Figure 3:
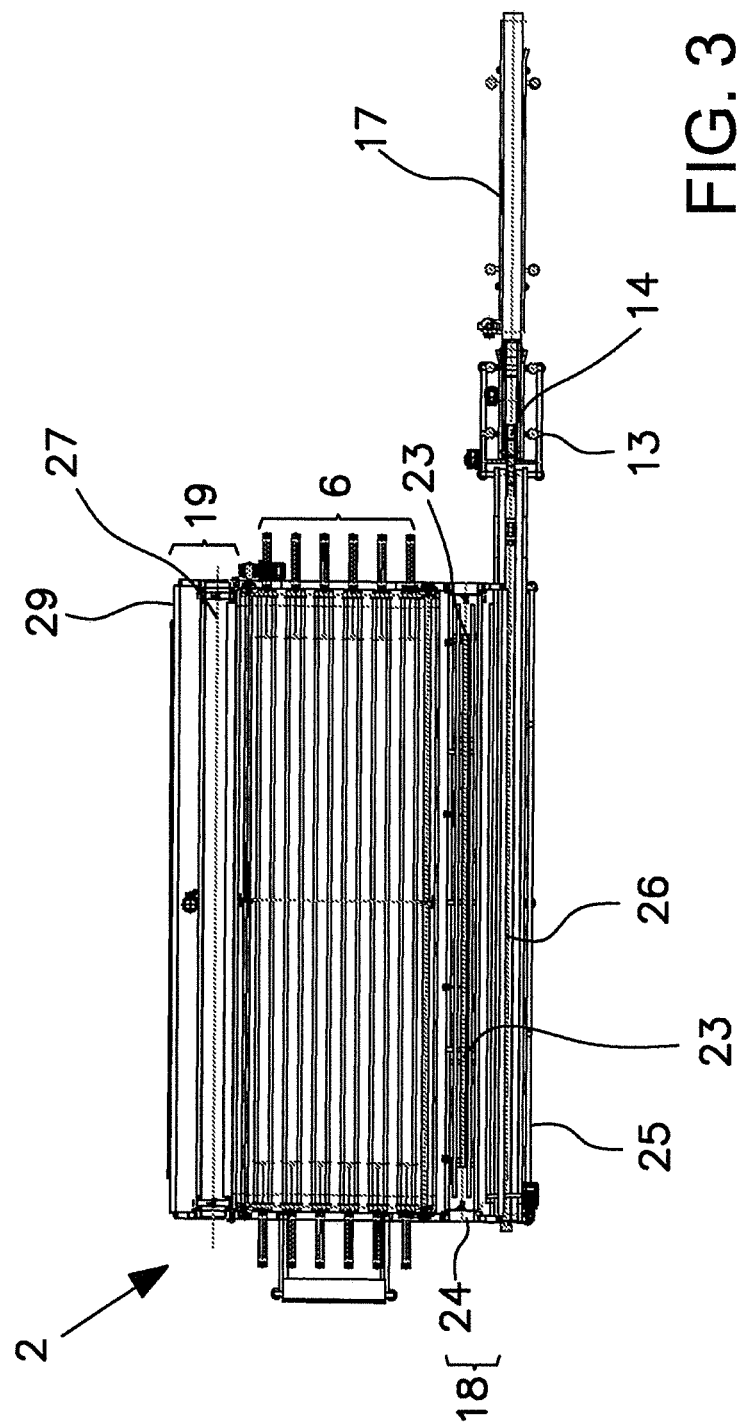
FIG. 3 is a plan view of the machine of this invention which includes the transfer structure, the swinging mechanism, the turning over means and the conveyor belt.

FIG. 3 shows exemplary machine 2, lifting means 18 consisting in a first conveyor belt 25 with turning over means 26 and a first transfer structure 24 with swinging mechanisms 23, press means 6, unloading means 19 consisting of a second transfer structure 27 and a second conveyor belt 29, means for turning over 13, blades 14 and a third conveyor belt 17.

Figure 4:
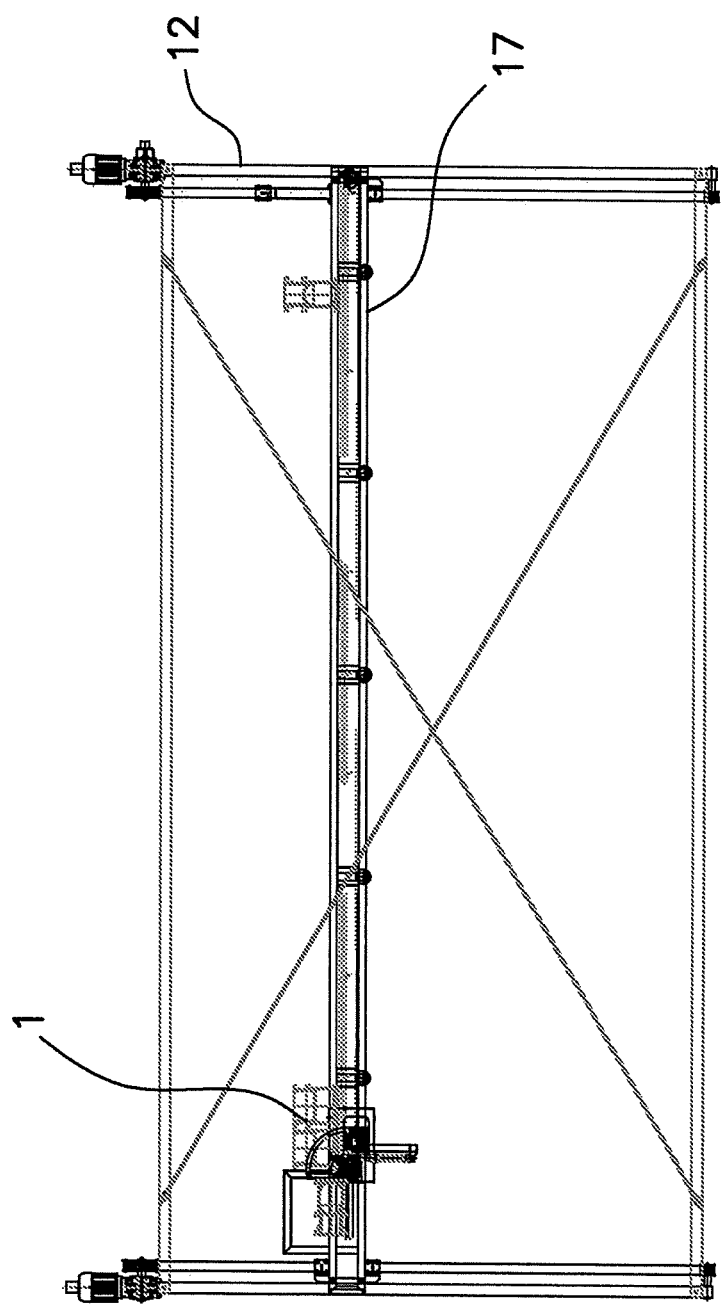
FIG. 4 is a side view from the side of the mold feeder, with one single level.

FIG. 4 illustrates exemplary molds 1, frame 12 and lifting means 17.

Figure 5:
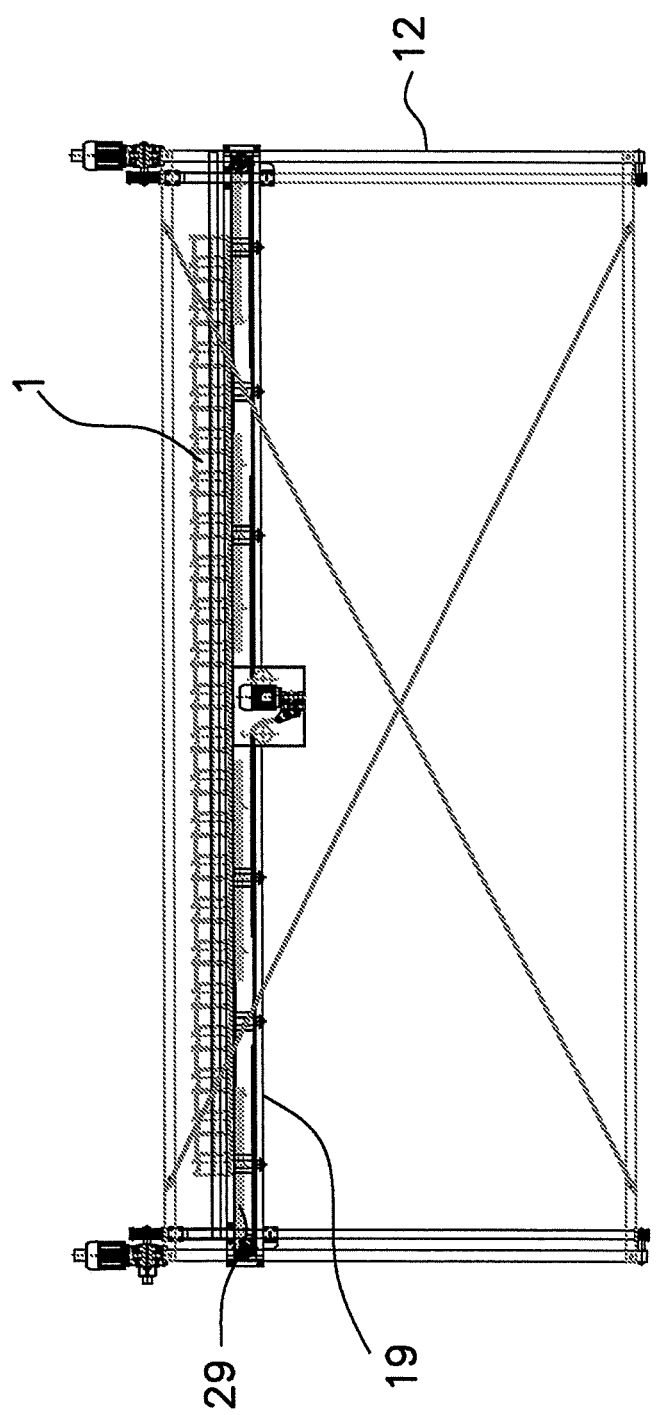
FIG. 5 is a side view from the side of the mold unloading device, with one single level.

FIG. 5 illustrates exemplary molds 1, second conveyor belt 29, unloading means 19 and frame 12.

Figure 6:
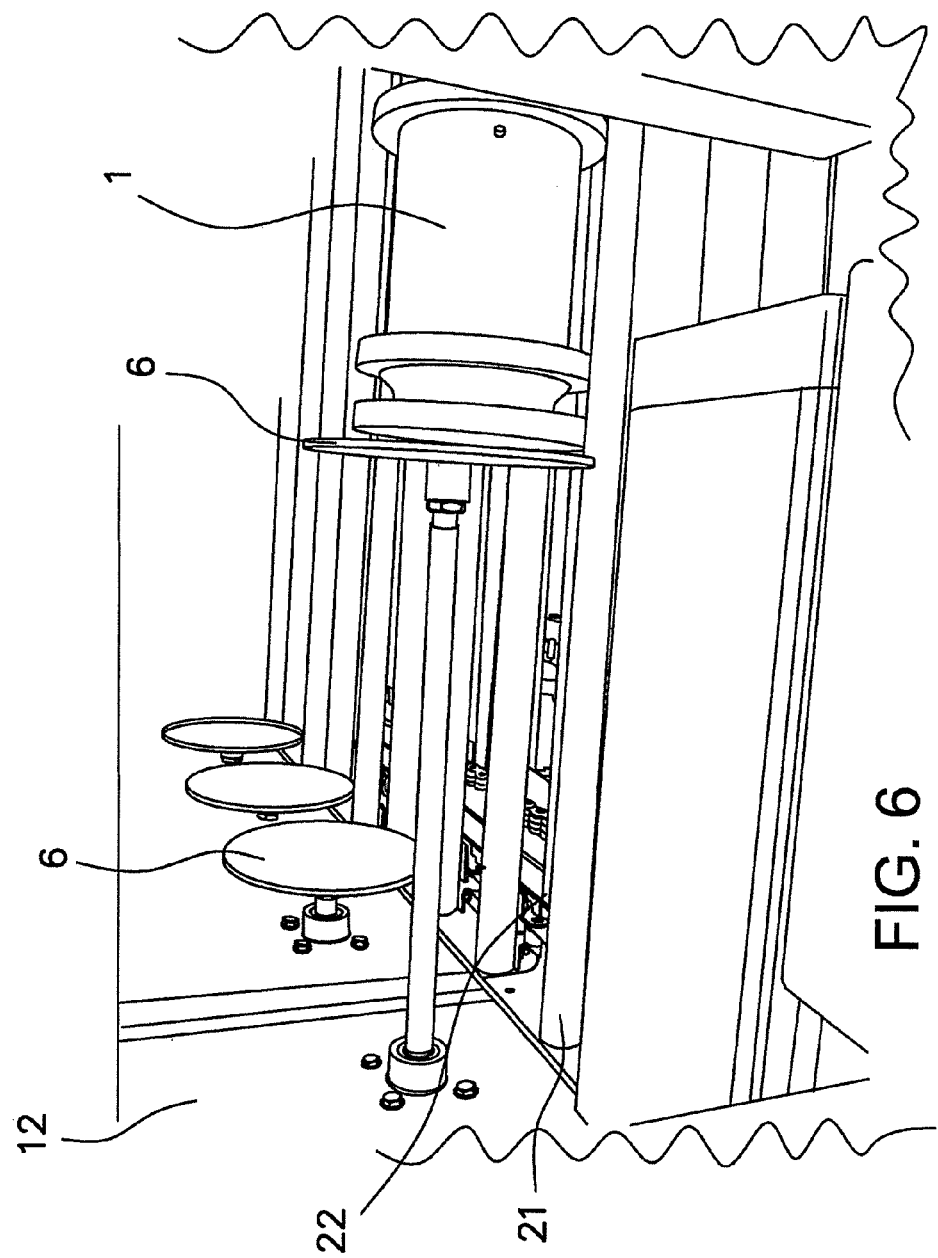
FIG. 6 is a detail of the workings of the presses.

FIG. 6 illustrates exemplary molds 1, frame 12, presses 6, tubular structures 21 and bases 22.

Figure 7:
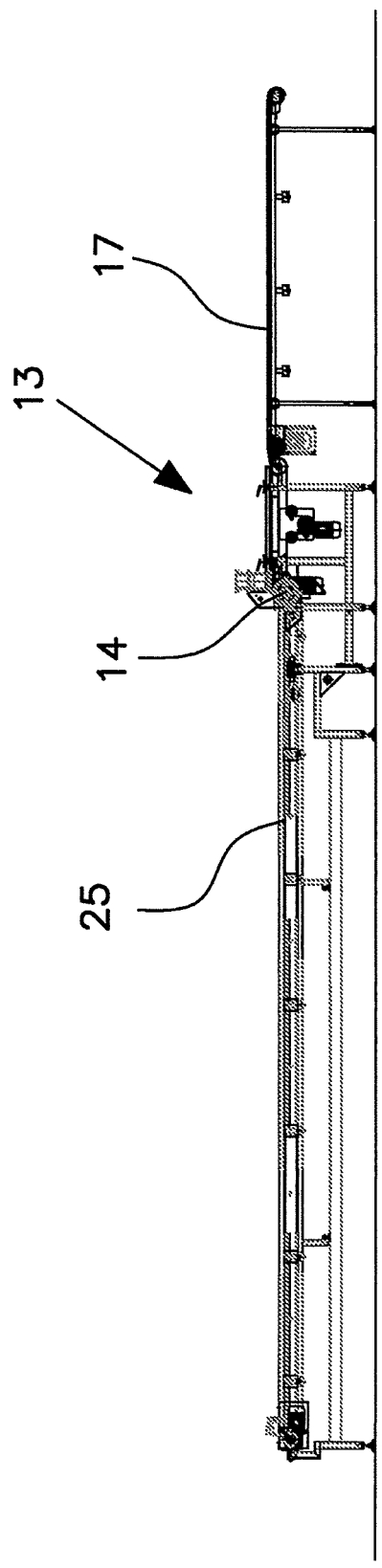
FIG. 7 is a picture of the turning over element with the transporter and the molds knocked down.

FIG. 7 illustrates the exemplary first conveyor belt 25, means for turning over 13, blades 14 and third conveyor belt 17.

Figure 8:
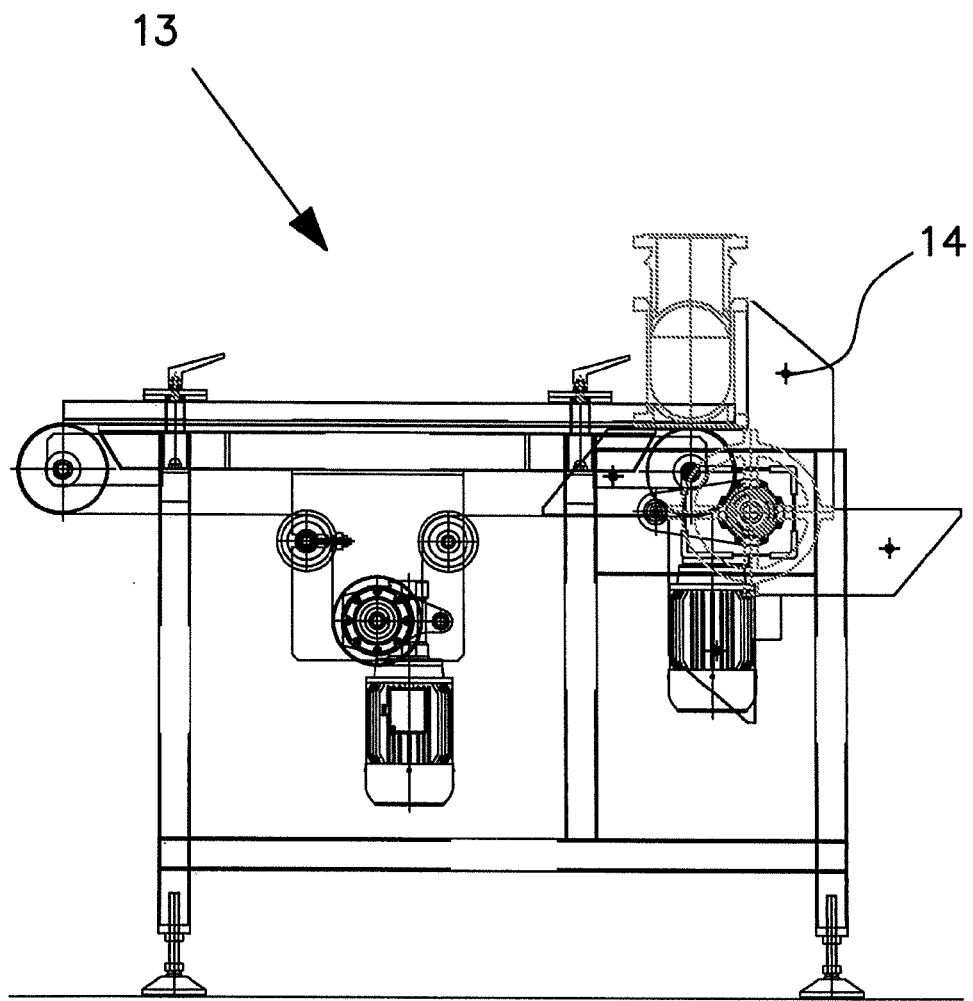
FIG. 8 is a detail of FIG. 7 of the turning over mechanism from the side opposite that of FIG. 7.

FIG. 8 illustrates means for turning over 13 and blades 14.

In a particular embodiment the method for pressing cheese molds comprises initially a first stage wherein molds 1 with cheese inside them and duly covered, are transported to means for turning over 13.

Molds 1 reach said means for turning over 13 (FIG. 7) by means of a third conveyor belt 17. Said molds 1 reach means for turning over 13, either standing up or vertical, but they enter machine 2 horizontally, and that is where said means for turning over 13 are needed, which, when referencing the machine, are explained later in greater detail (FIGS. 7 and 8).

Once they reach means for turning over 13, in a second stage, they access a blade system 14, which may be structured like a ferric wheel or revolving mechanism (FIG. 8), where molds 1 are knocked over to subsequently access the first conveyor belt 25 (FIGS. 3 and 7).

Said blades 14 may be arranged at an equal distance around a hub and as indicated above they push said mold 1 from a vertical position to a horizontal one.

Then said molds are transported and loaded onto a first transfer structure 24. The first conveyor belt 25 has a swinging system which when it faces said first transfer structure 24 transfers molds 1 from first conveyor belt 25 to first transfer structure 24 via turning over means 26 (FIG. 2).

Said first transfer structure 24 can raise and lower to place molds 1 on the appropriate loading level.

Then, in the third stage, FIG. 2, said molds 1 can be moved from first transfer structure 24 to a first horizontal structure 3, in frame 12, arranged on a first level 7, which lies in the initial position, until first horizontal structure 3 is full of molds 1.

Moving of molds 1 can be aided by a swinging mechanisms 23 which move molds 1 from first transfer structure 24 to first horizontal structure 3 (FIG. 2) until it is full.

Then, in a fourth stage where driving means 4 move said first structure 3 into an adjacent, second position, and place in the initial position a second horizontal structure 5, empty of molds to be loaded again from first transfer structure 24.

Finally in the fifth stage once the available structures 3,5, have been loaded with molds 1, molds 1 are pressed, at both ends of structures 3,5, with pressure means 6 (FIG. 6).

As shown in FIG. 2, one of the advantages of this method and the machine is that it makes it possible to work on different levels.

The unloading stage consists initially of releasing pressure on molds 1 by presses 6 (FIG. 6). Then the third horizontal structure 10, located at one of the ends, loaded with molds 1, once it is released from the pressure from presses 6, is advanced by driving means 4, until it loses the horizontal, unloading all molds 1 into unloading means 19.

Said unloading means 19 comprise a second transfer structure 27 and this can rise or descend to collect molds 1 on each respective level 7,8,9,15,16.

Subsequently, said unloaded molds 1 are transferred to the second conveyor belt 29 which from there transports them to another work station.

In this embodiment third horizontal structure 10 lies on the side opposite the loading side for molds 1. Thus, lifting/loading means 18 may be different from unloading means 19. In the event of small installations, it can be arranged that lifting/loading means 18 and unloading means 19 are the same, thus availing of space, as shown in FIG. 2.

It has been envisaged in this embodiment that driving means 4 which move structures 3, 5, 10 be a revolver type mechanism.

The pressing machine for cheese molds comprises a frame 12 and machine feeder means.

It also comprises means for turning over 13 that knock down said molds 1 from a vertical position to a horizontal one, as shown in FIGS. 7 and 8.

This is because the foodstuffs are placed in mold 1 vertically, and the respective lid may be applied. Thus they reach the machine and therefore can be turned over so that they can be pressed horizontally in machine 2.

It also comprises a first conveyor belt 25 which transports molds 1 knocked down horizontally by means for turning over 13 to a first transfer structure 24. Said first transfer structure 24, can raise and lower molds 1 to place them at the appropriate loading level.

It also comprises a first horizontal structure 3, arranged on first level 7, on which said molds 1 are loaded horizontally, and a second horizontal structure 5, empty and adjacent to the first structure 3.

In order to transfer molds 1 from first transfer structure 24 to first horizontal structure 3, means 23 have been provided for said transfer, in this embodiment a swinging mechanism, which moves molds 1 from first transfer structure 24 to first horizontal structure 3.

The machine has driving means 4 which move said first structure 3 into an adjacent, second position, and place in the initial position a second horizontal structure 5, empty of molds to be loaded, and so on at each level.

Finally, it also has pressing means 6 which press molds 1 at both ends of structures 3,5,10.

As can be seen in FIG. 1, in this embodiment the machine is made up of two installations, which at both ends have respective presses 6, so that the loading and unloading is performed on each side.

As shown in FIG. 2, the machine can comprise more than one level 8, 9, 15, 16, this way it allows the molds to be stacked and pressed in an efficient manner.

Unloading means 19 may comprise a second transfer structure 27 which transfer on a second conveyor belt 29 the molds that have just been unloaded. Immediately afterwards, said second conveyor belt 29 may transport molds 1 to another work station.

As explained above, the driving means 4 may be a revolver type mechanism, which makes it possible to define different work stations or structures for filling them with molds 1.

Horizontal structures 3,5 may be made up of two tubular elements 21 on the sides and a base 22, and both may be integral to driving means 4 (FIG. 6). Such a structure has proved to be advantageous. Finally, transferring means 23 for transferring said molds 1 from transfer structure 24 to first horizontal structure 3 may comprise swinging means or a similar structure.

This invention describes a method for pressing cheese molds and a pressing machine for cheese molds. The examples mentioned herein do not limit this invention, and therefore said invention can have different applications and/or adaptations, all within the scope of the following claims.

What is claimed is:

1. A mold pressing machine, comprising:
   a frame;
   a machine feeding means;
   a turning over means which turns over molds, previously filled in, from a vertical position to a horizontal position in order to allow exerting a horizontally directed pressing force on the molds;
   a first horizontal structure arranged on a first level, on which said molds are loaded horizontally;
   a second horizontal structure, empty and adjacent to the first horizontal structure;
   a transferring means for transferring said molds from a first transfer structure to the first horizontal structure by raising and lowering said molds to place the molds at a loading level;
   a driving means which moves said first horizontal structure from an initial position to a second position adjacent to the initial position, and which also moves the second horizontal structure from the initial position;
   a pressing means that applies a horizontal pressure at ends of the molds residing with the first and second horizontal structures; and
   a first conveyor belt which transports the molds knocked down horizontally by said turning over means to said first transfer structure, which raises and lowers the molds to one or more loading levels,
   wherein said turning over means is constructed in a shape of a Ferris wheel, comprising blades arranged at an equal distance around a hub which push said molds from the vertical position to the horizontal position and which in turn loads a following mold with a respective blade immediately following to that which has performed a respective turning over action.

2. The machine according to claim 1, wherein the first transfer structure moves the molds to more than one level.

3. The machine according to claim 1, further comprising an unloading means, which comprises a second transfer structure and a second conveyor belt that collects said molds.

4. The machine according to claim 1, wherein the driving means comprises a revolving mechanism.

5. The machine according to claim 4, wherein the first and the second horizontal structures comprise two tubular elements on sides thereof and a base that is integral to the driving means.

6. The machine according to claim 1, wherein the transferring means for transferring said molds from the first transfer structure to the first horizontal structure is a swinging means.

7. A mold pressing machine, comprising:
   a frame;
   a machine feeding means;
   a turning over means which turns over molds, previously filled in, from a vertical position to a horizontal position in order to allow exerting a horizontally directed pressing force on the molds;
   a first horizontal structure arranged on a first level, on which said molds are loaded horizontally;
   a second horizontal structure, empty and adjacent to the first horizontal structure;
   a transferring means for transferring said molds from a first transfer structure to the first horizontal structure by raising and lowering said molds to place the molds to a loading level;
   a driving means which moves said first horizontal structure from an initial position to a second position adjacent to the initial position, and which also moves the second horizontal structure from the initial position;
   a pressing means that applies a horizontal pressure at ends of the molds residing with the first and second horizontal structures;
   a first conveyor belt which transports the molds knocked down horizontally by said turning over means to said first transfer structure, which raises and lowers the molds to one or more loading levels, and
   an unloading means, which comprises a second transfer structure and a second conveyor belt that collects said molds, wherein said turning over means is constructed in a shape of a Ferris wheel, comprising blades arranged at an equal distance around a hub which push said molds from the vertical position to the horizontal position and which in turn loads a following mold with a respective blade immediately following to that which has performed a respective turning over action.

8. The machine according to claim 7, wherein the first transfer structure moves the molds to more than one level.

9. The machine according to claim 7, wherein the driving means comprises a revolving mechanism.

10. The machine according to claim 9, wherein the first and the second horizontal structures comprise two tubular elements on sides thereof and a base that is integral to the driving means.

11. The machine according to claim 7, wherein the transferring means for transferring said molds from the first transfer structure to the first horizontal structure is a swinging means.

\* \* \* \* \*